Oct. 7, 1969  A. B. BISHOP III  3,471,685
METHODS AND MEANS FOR STATISTICAL VARIANCE ANALYSIS OF SHEET
MANUFACTURING PROCESSES USING SCANNING AND DWELLING GAUGES
Filed June 19, 1964  2 Sheets-Sheet 1

INVENTOR.
ALBERT B. BISHOP 3rd
BY
G. Henry Peterson
AGENT

INVENTOR.
ALBERT B. BISHOP 3rd
BY G. Henry Peterson
AGENT

United States Patent Office 3,471,685
Patented Oct. 7, 1969

3,471,685
METHODS AND MEANS FOR STATISTICAL VARIANCE ANALYSIS OF SHEET MANUFACTURING PROCESSES USING SCANNING AND DWELLING GAUGES

Albert B. Bishop III, Columbus, Ohio, assignor to Industrial Nucleonics Corporation, a corporation of Ohio
Filed June 19, 1964, Ser. No. 376,411
Int. Cl. G01d 21/00; G06g 7/48
U.S. Cl. 235—151.13            27 Claims

ABSTRACT OF THE DISCLOSURE

Disclosed herein are methods and apparatus for separating the statistical variance of a measured sheet property into components of cross-sheet or profile variance $\sigma_p^2$, machine direction variance $\sigma_m^2$ and random variance $\sigma_r^2$. These components are automatically computed using the relations $$\sigma_p^2 = \sigma_s^2 - \sigma_D^2$$
$$\sigma_m^2 = \tfrac{1}{2}\sigma_\Sigma^2 - \sigma_D^2$$

and $$\sigma_r^2 = 2\sigma_D^2 - \tfrac{1}{2}\sigma_\Sigma^2$$

where $\sigma_s^2$ is the statistical variance of a signal derived from a gauge which measures the sheet property while scanning across the width of the longitudinally moving sheet, $\sigma_D^2$ is the statistical variance of a signal derived from a gauge which measures the sheet property while dwelling at a fixed point across the width of the longitudinally moving sheet, and $\sigma_\Sigma^2$ is the statistical variance of the sum of the signals derived from two gauges measuring the sheet property while dwelling at two spaced points respectively across the width of the longitudinally moving sheet.

---

This invention relates to methods and means for performing statistical analyses of laterally extended, traveling materials, as exemplified by the product of a continuous sheet process, and more particularly it relates to a system for separating the statistical variance of a measured quality characteristic of the material into components identified with lateral variations, variations in the direction of travel of the material, and random variations.

The mathematical analysis which provides the basis for the present invention is set forth in my article entitled "Techniques for Real-Time Determination of the Components of Variance for Control of Continuous-Sheet Processes," published in the IEEE Transactions on Automatic Control, volume AC-8, No. 4, October 1963, page 321, and accordingly the disclosures of this article and the publication references cited in the bibliography appended thereto are incorporated by reference herein.

The practice of the present invention will be herein illustrated and described in connection with the analysis of an industrial process for manufacturing sheet material, for the purpose of separating the automatically computed variance of the material thickness into a cross-sheet or profile variance component, a machine direction component, and a random component. This application of the invention to industrial product analysis utilizes the automatic measurements provided by a commercial gauge such as a thickness gauge adapted to scan or traverse across the width of the sheet in a direction orthogonal to the direction of movement of the sheet as it travels through the processing apparatus. This application of the invention further utilizes one or more commercial variance computers, receiving signals derived from the thickness gauges and constituting an analog of the measured thickness variations. For a detailed description of such a computer, reference can be made to U.S. Patent 2,965,300, issued Dec. 20, 1960, to S. A. Radley et al. Since the variance component values isolated by the system of the present invention are generally related to particular sources of variation in the process which contribute to the overall variance, the system of the invention enables the sheet manufacturer to identify current or impending conditions in the process which cause deterioration of the product with respect to its desired uniformity.

In accordance with the invention, the components of variance are derived from mathematical computations of functions of the differences between the overall variance values obtained from a scanning measurement across the width of the sheet and the overall variance values obtained from one or more measurements made at fixed locations across the sheet.

It is an object of the invention to provide a method and means for computing the value of the component of variance specifically associated with variations across the width of a traveling material, in the presence of simultaneously occurring variations having both a random nature and a variation specifically associated with the movement of the material in its direction of travel.

It is also an object to provide a method and means for computing the value of the variance component specifically associated with random variations in a traveling material, in the presence of variations specifically associated with the movement of the material and variations in the material which are specifically orthogonal to the direction of movement.

It is likewise an object to provide a method and means for computing the value of the variance component specifically associated with variations in the material occurring in its direction of movement, in the presence of both random variations and variations in the material which are orthogonal to the direction of movement.

It is another object of the invention to provide methods and means for statistically analyzing the material produced by continuous sheeting processes for the specific cross-sheet and/or machine-direction and random components of the variance.

It is still another object to provide novel apparatus for carrying out the statistical methods of the invention automatically.

Further objects of the invention will become apparent in the following detailed description of exemplary methods and means for accomplishing the foregoing and other objects, taken in connection with the accompanying drawings, in which:

Figure 1:
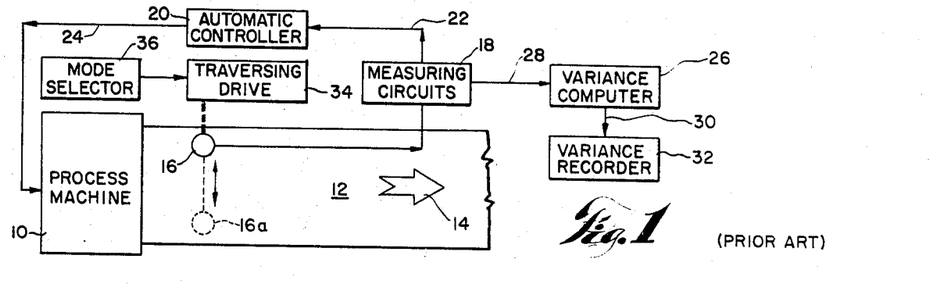
FIG. 1 is a generalized schematic diagram of a sheeting process machine having associated therewith a conventional arrangement of a scanning gauge, automatic control device and variance computer system, which are utilized in a novel manner in practicing the present invention for computing the cross sheet or profile variance component.

Referring to FIG. 1, the numeral 10 indicates a process machine for forming a continuous sheet 12 traveling in the direction of the arrow 14. At 16 is shown generally a gauging head or transducer device responsive to a quality characteristic in the sheet 12, for example, its weight per unit area, moisture content or composition. Connected to the gauging head 16 are conventional measuring circuits 18. Measuring circuits 18 are generally associated with a conventional recorded (not shown) of the strip-chart or profile-indicating variety, for providing a visual indication and a continuous record of the variations in the quality characteristic detected by the transduced mounted in gauging head 16.

At 20 is illustarted a conventional automatic controller which receives via connection 22 a signal automatically derived from the measuring function of circuits 18. Controller 20 continuously compares the measured value of the quality characteristic with a desired value for said characteristic, and provides at its output signals, via connections indicated by line 24, for energizing control actuators (not shown) in the process machine 10, so as to maintain the average value of the quality characteristic of sheet 12 at a substantially constant value.

The numeral 26 indicates a commercial variance computer which is similar to the device described in the Radley et al. patent cited above. Computer 26 receives via connections 28 a signal, derived from measuring circuits 18, which varies proportionally with the time-varying value of the quality characteristic measured by gauging head 16 as the sheet 12 travels past the transducer mounted therein. At periodic intervals variance computer 26 provides at its output 30 a signal indicative of a computer value of the variance, which is read out on a suitable recorder or other indicator shown by the reference numeral 32. Recorder 32 may be operated in a time-sharing mode with measuring circuits 18 so as to indicate in sequence the variations measured by gauging head 16 and thereafter to indicate the statistical variance of the measurement previously recorded, in the manner described in the Radley et al. patent aforesaid.

Conventionally also, the sheet gauge 16, 18 is equipped with a traversing drive mechanism 34, constituting a motorized arrangement for causing the gauging head 16 to traverse at a uniform speed across the width of the sheet 12, so as to detect variations in the profile structure of the sheet as well as the variations which occur due to the movement of the sheet in the machine direction. Interconnected with the traversing drive system is a conventional mode seletcor or switching arrangement, indicated generally by the numeral 36, whereby the machine operator may select either a scanning mode or a dwelling mode of operation for the gauge.

When operated in the scanning mode, the gauging head 16 is moved at a uniform speed across the width of the sheet while the measurements are being recorded as aforesaid. When operated in the dwelling mode, the gauging head 16 remains stationary at any desired point across the width of the sheet while the measurements are being recorded, and hence the variations measured are associated only with the movement of the sheet in the machine direction.

The variance computer indicated at 26 is an analog device which automatically computes the variance on a real-time basis, in accordance with the equation:

$$\sigma^2 = \frac{1}{T}\int_{t=0}^{T} X^2 dt - \left[\frac{1}{T}\int_{t=0}^{T} X dt\right]^2 \quad (1)$$

Here X represents the instantaneous value of the signal on line 28 received at the computer; T represents the length of the sampling interval during which the signal X is being received for processing by the computer circuits; $dt$ represents the differential time unit, and $\sigma^2$ represents the computed value of the variance.

When the gauge is operating in the dwelling mode, the value obtained for the variance is herein identified as $\sigma_D^2$. This variance value is the sum of two variance components, the variance of the sheet characteristic in the machine direction, herein identified as $\sigma_m^2$, and a random variance component identified as $\sigma_r^2$. When the computation is made with the gauge in the scanning mode, the variance value obtained is identified as $\sigma_s^2$. $\sigma_s^2$ is the sum of three component variances including the machine direction component $\sigma_m^2$, the random component $\sigma_r^2$ and a further component identified as the cross sheet or profile variance $\sigma_p^2$. From this follows the two relationships:

$$\sigma_s^2 = \sigma_m^2 + \sigma_r^2 + \sigma_p^2 \quad (2)$$

$$\sigma_D^2 = \sigma_m^2 + \sigma_r^2 \quad (3)$$

Using these relations, the profile variance $\sigma_p^2$ may be obtained in accordance with the invention by the following procedure. Utilizing the mode selector switch to place the traversing gauge in the scanning mode, the variance is computed by computer 26 and recorded on recorder 32. The mode selector switch 36 is then placed in the dwelling mode and the variance $\sigma_D^2$ is computed and recorded on recorder 32. Using the two recorded variance readings, the profile variance component is then calculated by $$\sigma_p^2 = \sigma_s^2 - \sigma_D^2 \quad (4)$$

In carrying out the measurements and computations according to the foregoing method for obtaining the value of the profile variance, due consideration must be given to the essential conditions under which the foregoing equations describe a valid statistical model of the process. For example, it is required that during the period of time that the two measured variance computations are being made, the process must remain substantially stationary in the statistical sense; that is, its statistical properties must remain substantially unchanged regardless of any translation of the time origin selected for the computations in accordance with Equation 1.

In practice, this means that statistical properties of the process output should be the same during the computation of $\sigma_D^2$ as they were during the preceding computation of $\sigma_s^2$, and moreover the statistical properties should not vary substantially during either of the two intervals during which the signal received on line 28 is being processed by the circuitry of the variance computer 26. Thus the characteristics of each particular process must be considered, and in some processes the computations will not usually be carried out, for example, immediately after start-up, during specification changes, before process temperatures have stabilized, during changes in the composition of raw materials supplied to the process machine, when the transport mechanism is being accelerated or decelerated, when the raw material supply is partially depleted, under other conditions where the process is being operated under unstable conditions. By this it is not meant to imply that the computation method of the invention is not usable under such conditions, since often valuable information can be obtained thereby even though the results may not be statistically as significant.

Preferably the computing time, which extends from zero to T in Equation 1, should be the same in both the computation of $\sigma_S^2$ and the computation of $\sigma_D^2$. Hence the time setting of the integration timer (not shown) in variance computer 26 is made equal to the time required for the gauging head 16 to traverse from the beginning to the end of its scan across the width of sheet 12. When it is desired to use a sampling or scanning interval of long duration relative to the open-loop response time of the regulating system which includes the measuring system, the automatic controller, and the process machine adjusting actuator, in combination with the transportation lag time required for the material to move from the process machine 10 to the location of the gauging head 16, the computations are preferably made with the automatic controller in operation to help maintain the desired stationary condition of the process. Alternatively, control may be exercised by manual adjustments.

Figure 2:
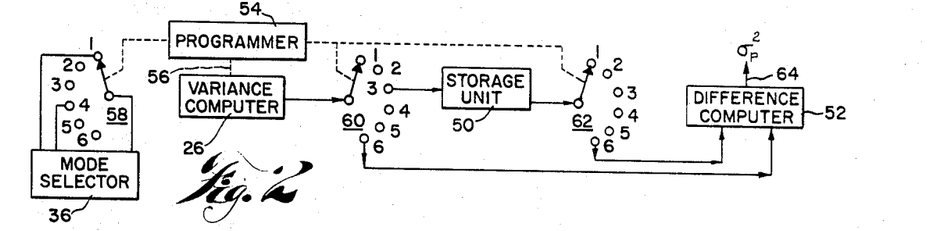
FIG. 2 is a schematic diagram showing the manner in which the conventional arrangement of FIG. 1 may be modified to effect the computation of the profile variance component by fully automatic means.

The sketch shown in FIG. 2 outlines a relatively simple arrangement of apparatus whereby the foregoing method of computing the profile component of the variance may be carried out by completely automatic means for performing a repetitive cycle of computation and readout at periodic intervals, in a manner similar to that described in the Radley et al. patent cited. The provision of this automatic system merely requires the addition to the system of FIG. 1 of a conventional storage unit 50, a conventional difference computer 52 and a programmer unit 54. It is to be noted that the programmer 54 may be simply an elaboration of the the clock-operated programming unit which is conventionally used in the variance 26 per se. Thus the programmer 54 may simply incorporate the function of programming the variance computer per se as a subroutine. Such an interconnection is illustrated by the dashed line 56.

For the purpose of illustrating the main sequence of the computation cycle, programmer 54 is shown mechanically interconnected with thre six-point stepping switch sections 58, 60 and 62. Switch section 58 is automatically operated by programmer 54 to actuate the mode selector 36. In position 1 of stepping switch 58, the mode selector 36 is placed in the scanning mode Positions 2 and 3 are inactive positions, and in position 4 the mode selector is placed in the dwelling mode position. Positions 5 and 6 are inactive positions.

Switch section 60 is arranged to selectively connect the output of variance computer 26 either to the storage unit 50 in position 3 of the switch, or to connect the variance computer output to the difference computer 52 in position 6 of the switch. In position 6 of switch section 62, the output of storage unit 50 is also connected to the difference computer 52.

Figure 3:
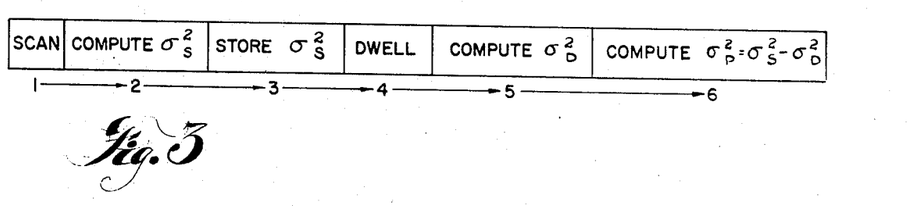
FIG. 3 is a diagram illustrating qualitatively the time sequence of the steps in my method of computing profile variance, as it may be performed either manually, using the prior art arrangement of apparatus shown in FIG. 1, or by the automatic arrangement of FIG. 2.

Referring to the time sequence diagram of FIG. 3, the numerals identifying the steps in the programming sequence are identical with the numerals used to identify the six points on stepping switches 58 to 62 in FIG. 2. The operation of the system proceeds as follows. With the stepping switches in position 1, the gauge head 16 (FIG. 1) scans the width of the sheet while the signal obtained from the measuring circuit feeds into variance computer 26. At the end of the scan, programmer 54 places the switches in position 2, while variance computer 26 performs the subroutine of computing $\sigma_s^2$. Programmer 54 then places its associated switches in position 3, and the $\sigma_s^2$ output of the variance computer is fed via switch section 60 into the storage unit 50. Programmer 54 then place the switches in position 4, thereby selecting the dwelling mode for the gauge. Preferably the gauging head is caused to dwell at the dotted line position 16a near the edge of the sheet 12 while the signal derived from the measuring circuits feeds into variance computer 26. Programmer 54 then places the switches in position 5, and via connection 56 causes variance computer 26 to perform the subroutine for computing $\sigma_D^2$. Programmer 54 then places the switches in the last position 6. This connects the $\sigma_D^2$ output of variance computer 26 to one input of difference computer 52. Simultaneously switch 62 connects the output of storage unit 50 to the difference computer. Difference computer 52 thereupon provides a signal on output line 64 indicating the value of $\sigma_p^2$. This signal may be applied to a suitable visual indicator or recorder; for example, the value of $\sigma_p^2$ may be read out on variance recorder 32 of FIG. 1 in the manner described in the Radley et al. patent cited.

Figure 4:
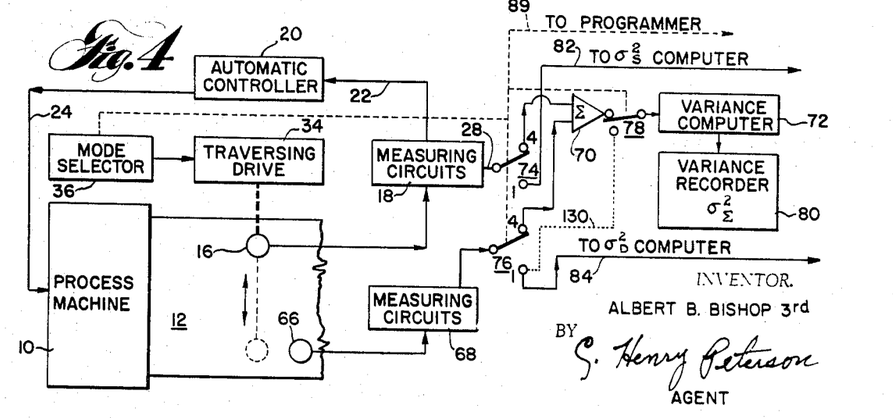
FIG. 4 is a schematic diagram of a modification of the apparatus of FIGS. 1 and 2, showing the addition to the system of a single point gauging device, a summing circuit, and an additional variance computer, in an arrangement for deriving the additional data required to compute the machine direction and random components of the variance.

From an inspection of Equations 2 and 3 it is apparent that these relationships do not provide sufficient information to permit a solution for either $\sigma_m^2$ or $\sigma_r^2$. In order to provide the necessary third independent relationship, it is necessary to add to the apparatus of FIG. 1. Referring to FIG. 4, there is shown a further gauging head 66, an additional measuring circuit 68 associated therewith, a summing circuit 70 and an additional variance computer 72. For illustrative purposes, FIG. 4 shows an arrangement which is adapted to be programmed automatically by programmer 54. Accordingly one input of the summing circuit 70 is adapted to be selectively connected through a stepping switch section 74 to the output 28 of the measuring circuit 18 of the scanning gauge. In a similar manner the other input of the summing circuit 70 is adapted to be connected through a further stepping switch section 76 to the output of measuring circuits 68 associated with gauging head 66. When the switches are in position shown, the output of summing circuit 70 is adapted to be connected through a still further stepping switch section 78 to the input of variance computer 72. For simplicity, only the switch contacts associated with points 1 and 4 of the stepping switches are illustrated.

According to the method of the present invention the third independent mathematical relationship aforesaid, which is combined with Equations 2 and 3 to permit computation of $\sigma_m^2$ and $\sigma_r^2$, is derived in the following manner. Gauging heads 16 and 66 are allowed to dwell for single-point measurement on sheet. For example, they may be allowed to dwell near the opposite edges of the sheet 12 as illustrated. The two signals derived from the respective measuring circuits 18 and 68 are fed into summing amplifier 70, and the summed signal output is fed via switch section 78 into variance computer 72. After the integrating time T has elapsed, the variance computer computes a variance value identified as $\sigma_\Sigma^2$ according to the relationship $$\sigma_\Sigma^2 = 4\sigma_m^2 + 2\sigma_r^2 \qquad (5)$$

This value may be read out on a recorder 80 connected to variance computer 72. This value of the summation signal variance, together with the scanning gauge signal variance and the dwelling gauge signal variance which were obtained as hereinabove described, may now be utilized to calculate the machine direction variance and the random variance using the following equations:

$$\sigma_m^2 = \tfrac{1}{2}\sigma_\Sigma^2 - \sigma_D^2 \qquad (6)$$

$$\sigma_r^2 = 2\sigma_D^2 - \tfrac{1}{2}\sigma_\Sigma^2 \qquad (7)$$

With an understanding of the foregoing method of computing the profile, machine direction and random variance components, one skilled in the art can readily visualize a number of alternative arrangements for performing the computation by manual means, by fully automatic means or by various arrangements for obtaining semiautomatic computations. One arrangement for fully automatic computation combines the apparatus of FIG. 4 with the apparatus of FIG. 5. FIG. 4 shows one variance computer 72 for computing $\sigma_\Sigma^2$ and indicates two signal lines 82 and 84 adapted to provide an input to individual variance computers $\sigma_s^2$ and $\sigma_D^2$, respectively. Such individual variance computers are shown at 86 and 88 of FIG. 5, together with a duplicate showing of $\sigma_\Sigma^2$ computer 72. It is to be noted that the commercial variance computer, such as that described in the Radley et al. patent cited, contains its own data storage arrangement for storing the variance values temporarily and for later providing signals indicative of the stored variance values.

Figure 5:
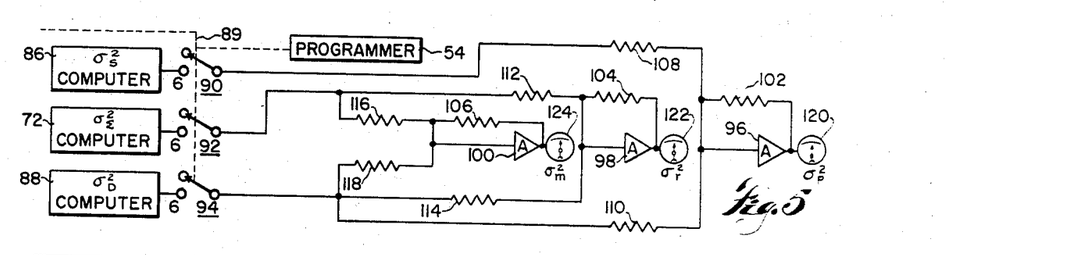
FIG. 5 is a circuit diagram of an illustrative readout computer which is utilized in combination with the apparatus of FIG. 4 for automatically effecting the computation of the machine direction and random variance components as well as the profile variance component.

The scanning gauge, the dwelling gauge, the three variance computers 72, 86, and 88, together with programmer 54 and its associated switching functions, constitute a data accumulation section for obtaining the three variance values and for storing the same in the circuits of the variance computers. As indicated by the dashed line 89, the programmer is connected to actuate three further stepping switch sections 90, 92 and 94 which are adapted in position 6 to connect the output of variance computers 86, 72 and 88, respectively, to suitable summing circuits. These summing circuits include conventional operational amplifiers 96, 98 and 100, having respective feedback resistors 102, 104 and 106 connecting the input and the output thereof. Amplifier 96 has input summing resistors 108 and 110. Amplifier 98 has input summing resistors 112 and 114. Amplifier 100 has input summing resistors 116 and 118.

When programmer 54 closes switches 90, 92 and 94, variance component values are computed as follows: A signal proportional to $\sigma_s^2$ is fed through summing resistor 108 to the input of amplifier 96, and a signal proportional to $\sigma_D^2$ is fed to the input of the amplifier through summing resistor 110. The output signal from $\sigma_D^2$ computer 88 has its polarity reversed with respect to the output signals from computers 72 and 86 so that the summing amplifiers 96, 98 and 100 provide output signals proportional to the differences between their respective input signals. Amplifier 96 provides an output voltage proportional to $\sigma_p^2$ which may be read out on a suitable indicator, recorder, automatic control computer or the like represented by the meter 120. This variance computation is made directly in accordance with Equation 4.

The value of $\sigma_r^2$ is computed by summing amplifier 98, which receives at its input a signal proportional to $\sigma_\Sigma^2$ via input resistor 112 and a signal proportional to $\sigma_D^2$ via input resistor 114. This computation is made in accordance with Equation 7.

Assuming that the signal outputs of computers 72 and 88 are identically proportioned to the calibrated values of the computed variances, the resistance value of resistor 112 is made four times as large as the value of resistor 114. The signal indicative of the value of $\sigma_r^2$ which appears at the output of amplifier 98 is registered on a suitable indicating device or other utilization device 122. It is understood that if this or the other computations are made with the algebraic signs reversed, the final indication is readily corrected by reversing the connections to the indicating device.

Summing amplifier 100 receives the $\sigma_\Sigma^2$ signal via input resistor 116 and the $\sigma_D^2$ signal via the other input resistor 118 and computes the value of $\sigma_m^2$ as in Equation 6. Again the resistor values are selected to be consistent with the constants in the equation. The output may be indicated on instrument 124.

Figure 6:
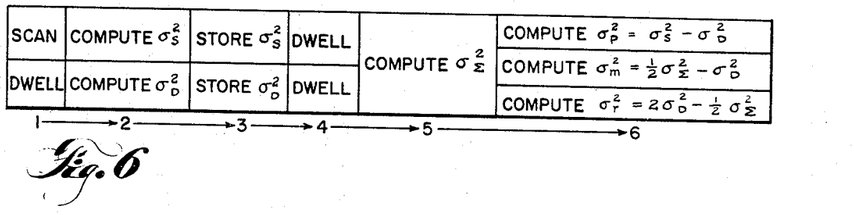
FIG. 6 is a diagram similar to FIG. 3, showing qualitatively a preferred time sequence for performing the steps in my method of computing the variance components utilizing the apparatus of FIG. 4, and also serving the purpose of illustrating the manner in which an automatic arrangement of the computer system shown in FIGS. 4 and 5 is programmed to carry out the computation method automatically.

FIG. 6 is a time sequence diagram showing the principal steps in the method of computing the three components of variance using the apparatus of FIG. 4. Also the diagram shows the manner of operation of programmer 54 and the fully automatic apparatus which may be provided to carry out the method automatically. The numerals beneath the time sequence diagram are again associated with the numbered points on the various sections of the stepping switches.

Referring to the diagram of FIG. 6, the operation of the automatic apparatus proceeds as follows. With the switches in number 1 position the mode selector 36 causes gauging head 16 to scan across the width of the sheet, while gauging head 66 dwells at a single point thereon. A single derived from measuring circuits 18 feeds over line 82 to the $\sigma_s^2$ computer 86, and a signal derived from measuring circuit 68 is fed via line 84 to $\sigma_D^2$ computer 88. Steps 2 and 3 of the method and the program are devoted to the computation and storage of $\sigma_s^2$ and $\sigma_D^2$ in the computers. It is understood that when one uses three variance computers of the type described in the Radley et al patent referred to hereinabove, each computer actually stores separately signals phoportional to the value of the integral of X and the integral of $X^2$ which appear in Equation 1, and the respective signals remain in storage until step 6. In step 4, gauging head 16 as well as gauging head 66 are both placed by the programmer in the dwelling mode, and with switches 74, 76 and 78 in position 4, the value of $\sigma_\Sigma^2$ is computed as hereinabove described. In step 6 the apparatus shown in FIG. 5 is utilized to compute the variance component values in the manner described hereinabove.

While in FIGS. 4 and 5 I have illustrated the use of three separate variance computers, in some installations it may be permissible and less expensive to operate one of the variance computers, for example, computer 72, on a time-sharing basis to compute, say, both $\sigma_D^2$ and $\sigma_\Sigma^2$ and to provide a storage unit such as storage unit 50 (FIG. 2) to store the value of $\sigma_p^2$ while $\sigma_\Sigma^2$ is being computed. Such a time sharing arrangement is indicated in FIG. 4 by the provision of stepping switch section 78 and the dotted line connection 130. With this arrangement, in position 1 of the switch the signal from measuring circuits 68 are fed directly to the input of variance computer 72. In step 2 variance computer 72 is utilized to compute $\sigma_D^2$. In step 3 the variance value in computer 72 is fed into storage unit 50 and the integrating circuits of the computer are cleared. In step 4, as indicated, variance computer 72 is used to compute $\sigma_\Sigma^2$ in the manner described previously.

While in FIGS. 1 to 3 I have illustrated the computation of the scanning variance as a first step and the computation of the dwelling variance as a subsequent step, it is apparent that the order of these data accumulation steps could be reversed. Likewise, it is apparent in the use of the apparatus of FIGS. 4 and 5 that $\sigma_\Sigma^2$ could be computed in the first instance and $\sigma_s^2$ and $\sigma_D^2$ could subsequently be computed. It would of course be obvious that $\sigma_\Sigma^2$ and either $\sigma_s^2$ or $\sigma_D^2$ could also be computed simultaneously in either of the foregoing orders. While this is quite possible, it is not recommended, since to do so might prevent $\sigma_s^2$ and $\sigma_D^2$ from being computed simultaneously and on the same part of the traveling material, which is highly desirable since a more accurate value of the profile variance $\sigma_p^2$ is obtained thereby.

Figures 7, 8:
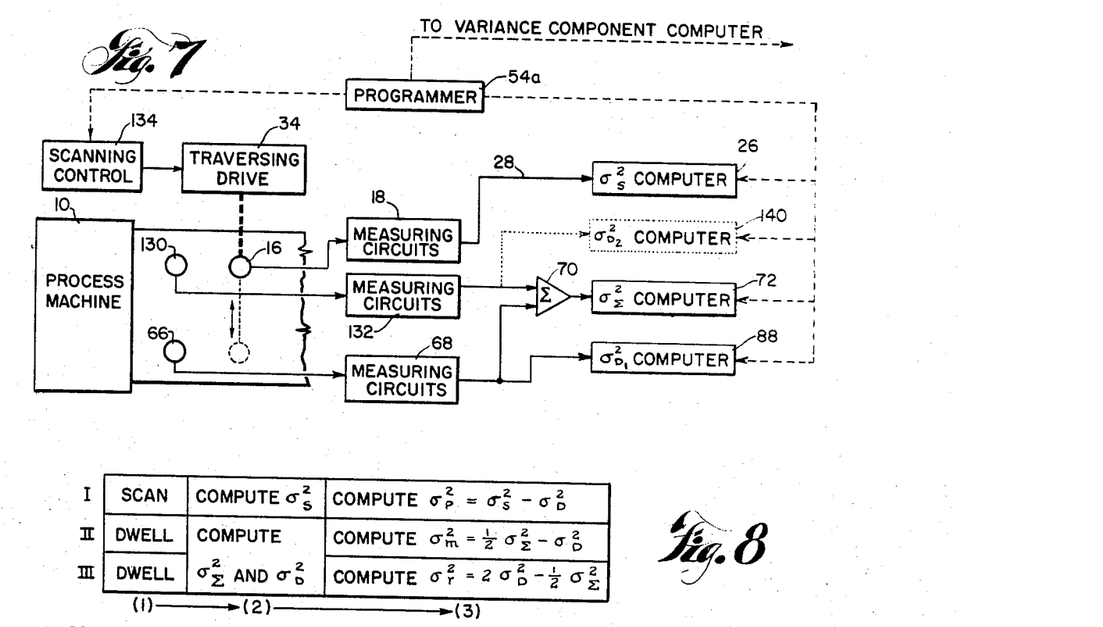
FIG. 7 is a schematic diagram of a modification of the apparatus of FIG. 4, showing the manner in which a further single-point gauge and at least one additional variance computer may be added to the system to permit a more rapid and accurate computation related to a single sample of the sheet material, to be carried out.
FIG. 8 is a time sequence diagram of the computation method of the invention utilizing the apparatus shown in FIG. 7.

FIG. 7 shows an arrangement whereby the data for computing all three of the variance components may be obtained in the period of a single scan of the traversing gauge head 16. In this arrangement a third gauging head 130, which need only be adapted to measure in the dwelling mode, and its associated measuring circuits 132 are added to the system. Here for the purpose of the variance computation the traversing gauge is only required to operate in the scanning mode. Accordingly there is illustrated a scanning control device 134 which usually forms a part of the mode selector 36 normally provided on commercial gauges. The scanning control 134 is triggered into operation periodically by programmer 54a at the beginning of the computation sequence.

In the FIG. 7 arrangement, measuring circuits 18, associated with the traversing gauge and variance computer 26, are used only to compute the scanning variance $\sigma_s^2$.

The signal derived from measuring circuits 68 is simultaneously fed into the summing amplifier 70 associated with the $\sigma_\Sigma^2$ computer 72 and into the $\sigma_D^2$ computer 88. Since the requirement of a time-sharing arrangement is obviated by the system of FIG. 7, the steps in the computation method are consolidated and carried out in parallel. As appears from FIG. 8, the programming of the main computation sequence is greatly simplified and carried out in only three phases. It is understood that the data accumulation apparatus of FIG. 7 is used in combination with the variance component computer shown in FIG. 5.

The availability of the second dwelling gauge in the arrangement of FIG. 7 allows the use of a further extension of the variance component separation techniques to minimize possible errors in the computed values of the variance components caused by certain conditions in certain processes. For example, consider a plastic sheeting calender, wherein the sheet 12 is formed between spaced rolls, and the effect on the variance components of a loose-bearing condition on one side of a calender roll. This obviously causes a periodic component, in the sheet thickness variation, which occurs in the machine direction. It is apparent also that the amplitude of this variation is greater on that side of the sheet which is formed at the end of the calender roll having the loose bearing than it is at the opposite side where the calender roll bearing is in good condition. With reference to FIG. 4, it is apparent that if the dwelling gauge head 66 happens to be sitting on the side which is associated with the loose bearing condition, the machine direction variance component will be unduly emphasized at the expense of the profile variance component. This effect is not completely compensated for by the fact that the loose bearing condition also shows up in the random component of the variance.

However, this effect can be compensated for by the optional arrangement of providing a further variance computer indicated by the dashed outline 140 in FIG. 7. With this arrangement, the additional variance computer 140 is used to compute the variance of the measurements provided by the second dwelling gauge 130, 132 at the same time that the variance of the dwelling gauge measurements provided by gauge head 66 are being computed by variance computer 88. The variance value computed by computer 88 is identified as $\sigma_{D1}^2$ and the variance computed by variance computer 140 is identified as $\sigma_{D2}^2$.

Figure 9:
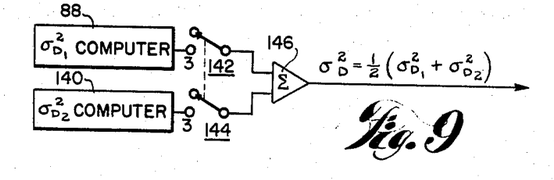
FIG. 9 is a schematic diagram showing the manner in which a further variance computer and summing device may be utilized with the arrangement of FIG. 7 so as to minimize the effect of one possible source of error in the computation which might otherwise arise due to certain conditions in the sheeting process.

With reference to FIG. 9, during the computation interval 3 the two dwelling variances $\sigma_{D1}^2$ and $\sigma_{D2}^2$ are fed through programmed switch sections 142 and 144 to the input of a summing circuit 146. The output of the summing circuit, which is proportional to the average value of the variances computed from the signals provided by the two dwelling gauges, is then used in the computation in the same manner that $\sigma_D^2$ is used as previously described. In the automatic arrangement, switch sections 142 and 144 are operated by programmer 54a, and the output of summing circuit 146 is fed into the output summing circuits through switch section 94, FIG. 5.

While the invention has been herein illustrated and described in connection with specific procedures and specific apparatus, it is apparent that many modifications of the procedures and apparatus can be made without departing from the scope of the invention.

What is claimed is:

1. The method of utilizing a system wherein a statistical variance computer receives a signal derived from a scanning gauge adapted to traverse across the width of a laterally extended, traveling material, which comprises causing said gauge to scan across said width, recording the computed variance of said signal as received by said computer during said scan, causing said gauge to dwell at a point along said width, and computing the difference between said recorded variance and the computed variance of said signal as received by said computer during the dwell of said gauge.

2. The method of utilizing a system wherein a statistical variance computer receives an input signal from a scanning gauge adapted to traverse across the width of a laterally-extended, traveling material and wherein said computer provides an output signal indicative of the computed variance of said input signal, which comprises causing said gauge to scan across said width, storing the value of said output signal provided by said computer at the end of said scan, causing said gauge to dwell at a point along said width of said material, and indicating the difference between said stored signal value and the value of said output signal provided by said computer at the end of said dwell of said gauge.

3. The method of utilizing a variance computer, a continuous signal summing device and a pair of variational signal-generating gauges located at different points across the width of a laterally extended, traveling material to obtain data for use in computing the values of a statistical variance component associated with variations in said material in its direction of movement and a component associated with its random variations, which comprises computing the variance $\sigma_D^2$ of the signal derived from one of said gauges during one time interval, continuously summing the signals for both of said gauges during another time interval, and computing the variance $\sigma_\Sigma^2$ of the sum of said signals.

4. The method of claim 3 which includes the step of computing a variance component in accordance with the equation $\sigma_m^2 = \frac{1}{2}\sigma_\Sigma^2 - _D^2$.

5. The method of claim 3 which includes the step of computing a variance component in accordance with the equation $\sigma_r^2 = 2\sigma_D^2 - \frac{1}{2}\sigma_\Sigma^2$.

6. In combination with a system wherein a statistical variance computer receives a first variational signal from a gauge adapted to measure at one point across the width of a laterally extended, traveling material whereby said computer computes a variance value containing one component associated with variations in said material along the length thereof and another component associated with random variations, the improvement of means for providing another variance value which is mathematically independent of said second variance value so as to permit computation of the separate values of said variance components, comprising a second gauge adapted to measure at another point across said width of said material for providing a second variational signal, means receiving said first and second signals from said first and second gauges for providing a third signal indicative of an algebraic sum of said first and second signals, and means receiving said third signal for computing a value for the statistical variance thereof.

7. In combination with a system wherein a statistical variance computer receives a first signal derived from a scanning gauge adapted either to traverse across the width of a laterally extended, traveling material or to dwell at a point along said width so as to permit said computer to compute either of two variance values, one of said values containing a component associated with variations in said material which occur across the width thereof, the improvement of means for providing a third variance value which is independent of said two variance values so as to permit computation of a random variance component and a variance component associated with variations along the length of said material, comprising a second gauge adapted to dwell at a point along said width of said material for providing a second signal, means receiving said first and second signals from said scanning gauge and said dwelling gauge for providing a third signal indicative of an algebraic sum of said first and second signals, and means receiving said third signal for computing a value for the statistical variance thereof.

8. A statistical variance component computer system which comprises a gauge having means for alternately selecting a scanning mode wherein said gauge is caused to traverse across the width of a laterally extended, traveling-material or a dwelling mode wherein said gauge is caused to dwell at a point along said width, a variance computer which receives from said gauge a variational signal indicative of a quality characteristic of said material and to provide an output signal indicative of a variance value therefor, means adapted to receive said output signal and to store a signal indication of said variance value, a difference computer, and switching means controlling said mode selector and said variance computer, and being programmed for a cycle of operation wherein said switching means sequentially:

(a) selects one of said modes of operation for said gauge and causes said variance computer to compute a first variance value in response to said variational signal received from said gauge operating in said selected mode, (b) delivers said variance computer output signal to said storage means for storage therein of said variance value signal indication, (c) selects the other of said modes of operation for said gauge and causes said variance computer to compute a second variance value in response to said variational signal received from said gauge operating in said other mode, and (d) delivers to said difference computer both said stored signal indication and a further signal indication derived from said output signal from said variance computer and indicative of said second variance value.

9. A statistical variance component computer system which comprises a pair of gauges adapted to measure at different points across the width of a laterally-extended, traveling material, each of said gauges being adapted to provide a variational signal indicative of a quality characteristic of said material, variance computer means adapted to receive a variational signal and to provide an output signal indicative of a variance value therefor, means for storing a signal manifestation of said variance value, a summing device adapted to receive a pair of variational signals and to provide an output signal indicative of an algebraic sum thereof, a difference function computer, and switching means programmed for a cycle of operation wherein said switching means (a) delivers said variational signal from one of said gauges to said variance computer and causes said variance computer to compute a first variance value, (b) causes said first variance value to be stored by said storage means, (c) delivers said variational signals from both of said gauges to said summing device, delivers said output from said summing device to said variance computer means to compute a second variance value, (d) delivers to said difference function computer a signal $\sigma_D^2$ derived from said stored signal manifestation in said storage means and indicative of said first variance value, and a signal $\sigma_\Sigma^2$ derived from said output signal from said variance computer and indicative of said second variance value.

10. Apparatus as in claim 9 wherein said difference function computer comprises means receiving said $\sigma_\Sigma^2$ and $\sigma_D^2$ signals for computing a variance component $\sigma_m^2$ in accordance with the relation $\sigma_m^2 = \frac{1}{2}\sigma_\Sigma^2 - \sigma_D^2$.

11. Apparatus as in claim 9 wherein said difference function computer comprises means receiving said $\sigma_\Sigma^2$ and $\sigma_D^2$ signals for computing a variance component $\sigma_r^2$ in accordance with the relation $\sigma_r^2 2\sigma_D^2 - \frac{1}{2}\sigma_\Sigma^2$.

12. A statistical variance component computer system which comprises a pair of gauges adapted to measure at different points across the width of a laterally extended, traveling material, each of said gauges being adapted to provide a variation signal indicative of a quality characteristic of said material, a first variance computer receiving said signal from one of said gauges during a first time interval, a summing device receiving said variational signals from both of said gauges during a second time interval for providing a sum output signal indicative of an algebraic sum of said received signals, a second variance computer receiving from said summing device said sum output signal during said second time interval, a difference function computer, and a programmed switching device causing each of said first and second variance computers to compute a value for the statisical variance of its received signal during said first and second time intervals respectively, whereby said first variance computer provides an output signal indicative of a first computed variance value $\sigma_D^2$ and said second variance computer provides an output signal indicative of a second computed variance value $\sigma_\Sigma^2$, said programmed switching device including means for delivering both of said variance computer output signals to said difference function computer during a third time interval.

13. Apparatus as in claim 12 wherein said difference function computer comprises means receiving said $\sigma_\Sigma^2$ and $\sigma_D^2$ signals for computing a variance component $\sigma_m^2$ in accordance with the relation $\sigma_m^2 = \frac{1}{2}\sigma_\Sigma^2 - \sigma_D^2$.

14. Apparatus as in claim 12 wherein said difference function computer comprises means receiving said $\sigma_\Sigma^2$ and $\sigma_D^2$ signals for computing a variance component $\sigma_r^2$ in accordance with the relation $\sigma_r^2 = 2\sigma_D^2 - \frac{1}{2}\sigma_\Sigma^2$.

15. A statistical variance component computer system which comprises a first gauge which is programmed to alternate during successive time intervals between a scanning mode wherein said gauge is caused to traverse across the width of a laterally extended, traveling material and a dwelling mode wherein said gauge is caused to dwell at a point along said width, another gauge adapted to dwell at one point across said width, each of said gauges providing a variational signal indicative of a measured quality characteristic of said material, means responsive to said variational signal from said first gauge in said scanning mode for providing a $\sigma_s^2$ output signal indicative of a computed variance value, means responsive to said variational signal from said other gauge for providing a $\sigma_D^2$ output signal indicative of a computed variance value, means responsive to an algebraic sum of said variational signal from said first gauge in said dwelling mode and said variational signal from said second gauge for providing a $\sigma_\Sigma^2$ signal indicative of a computed variance value, means responsive to said $\sigma_s^2$ and said $\sigma_D^2$ signals for computing a first variance component, and means responsive to said $\sigma_D^2$ and said $\sigma_\Sigma^2$ signals for computing a second variance component.

16. Apparatus as in claim 15 wherein each of said variance component computing means comprises an algebraic summing device having two electrical input circuits, said input circuits for said second variance component computing means having electrical components of mutually different values.

17. Apparatus for providing quality control data relative to the variations in a laterally extended, traveling material which comprises:
a scanning gauge adapted to traverse across the width of said material,
two other gauges adapted to dwell at two different points across said width,
each of said three gauges providing a variational signal indicative of a measured quality characteristic of said material,
means responsive to said variational signal from said scanning gauge for providing a first computed variance value,
means responsive to said variational signal from one of said other gauges for providing a second computed variance value, and
means responsive to an algebraic sum of said variational signals from said two other gauges for providing a third computed variance value,
each of said computed variance values being indicative of the statistical variance of the variational signal received by the respective signal responsive means as aforesaid during a predetermined time interval.

18. A statistical variance component computer system which comprises:
a scanning gauge adapted to traverse across the width of a laterally extended, traveling material,
two other gauges adapted to dwell at two different points across said width,
each of said three gauges providing a variational signal indicative of a measured quality characteristic of said material,
means responsive to said variational signal from said scanning gauge for providing a $\sigma_s^2$ output signal indicative of a computed variance value,
means responsive to said variational signal from one of said other gauges for providing a $\sigma_D^2$ output signal indicative of a computed variance value,
means responsive to an algebraic sum of said variational signals from said two other gauges for providing a $\sigma_\Sigma^2$ output signal indicative of a computed variance value,
means responsive to said $\sigma_s^2$ and said $\sigma_D^2$ signals for computing a first variance component associated with variations in said material across the width thereof, and
means responsive to said $\sigma_D^2$ and said $\sigma_\Sigma^2$ signals for computing a second variance component associated with other variations in said material.

19. A statistical variance component computer system which comprises:
a scanning gauge adapted to traverse across the width of a laterally extended, traveling material,
two other gauges adapted to dwell at two different points across said width,
each of said three gauges providing a variational signal indicative of a measured quality characteristic of said material,
means responsive to said variational signal from said scanning gauge for providing a $\sigma_s^2$ output signal indicative of a computed variance value,
means responsive to said variational signal from one of said other two gauges for providing a $\sigma_{D_1}^2$ output signal indicative of a computed variance value,
means responsive to said variational signal from the other of said other two gauges for providing a $\sigma_{D_2}^2$ output signal indicative of a computed variance value,
means responsive to an algebraic sum of said $\sigma_{D_1}^2$ and said $\sigma_{D_2}^2$ signals for providing a $\sigma_D^2$ output signal,
means responsive to an algebraic sum of said variational signals from said two other gauges for providing a $\sigma_\Sigma^2$ output signal indicative of a computed variance value,
means responsive to said $\sigma_s^2$ and said $\sigma_D^2$ signals for computing a first variance component associated with variations in said material across the width thereof, and
means responsive to said $\sigma_D^2$ and said $\sigma_\Sigma^2$ signals for computing a second variance component associated with other variations in said material.

20. A statistical variance component computer system which comprises:
a scanning gauge adapted to traverse across the width of a laterally extended, traveling material for providing a first variational signal indicative of a measured quality characteristic of said material,
a dwelling gauge adapted to dwell at a point across said width for providing a second variational signal indicative of said characteristic,
means responsive to said first variational signal for producing a $\sigma_s^2$ output signal indicative of a first computed variance value,
means responsive to said first variational signal for producing a $\sigma_D^2$ output signal indicative of a second computed variance value, and
means responsive to said $\sigma_s^2$ and $\sigma_D^2$ output signals for producing a $\sigma_p^2$ output signal indicative of the difference betwen said first and second computed variance values, said $\sigma_p^2$ signal providing a measure of the cross-sheet or profile component of the variance of said property in said material.

21. The method of utilizing a system wherein a signal processing device receives an input signal derived from a scanning gauge adapted to traverse across the width of a laterally extended, traveling material, said device producing an output signal which is a function of said input signal, said method comprising:
causing said gauge to scan across said width,
recording said output signal,
causing said gauge to dwell at a point along said width to obtain another output signal, and
combining said recorded signal with said other signal to produce a result signal.

22. The method of claim 21 wherein said combining step comprises:
computing a function of the difference between said signals.

23. A system comprising:
a statistical variance computer,
scanning gauge means adapted to traverse across the width of a laterally extended, traveling material and produce a signal responsive to a property of said material,
means for causing said gauge to scan across said width,
means for recording the computed variance of said signal as received by said computer during said scan,
means for causing said gauge to dwell at a point along said width, and
means for computing the difference between said recorded variance and the computed variance of said signal as received by said computer during the dwell of said gauge.

24. A system comprising:
a scanning gauge means adapted to traverse across the width of a laterally extended, traveling material for producing an input signal responsive to a property of said material,
a signal processing device receiving said input signal for producing an output signal which is a function of said input signal,
means for causing said gauge means to scan across said width, means for recording said output signal, means for causing said gauge means to dwell at a point along said width to obtain another output signal, and means for comparing said recorded signal with said other signal to produce a resultant signal.

25. Apparatus as in claim 24 wherein said comparing means comprises means for computing a function of the difference between said signals.

26. The method of determining the profile component of the variance of a laterally extended, traveling material, which comprises:

traversing a gauge across the width of said traveling material to produce a first signal responsive to the scanning measurement thereby provided by the gauge, positioning a gauge at a fixed point along said width to produce a second signal responsive to the dwelling measurement thereby provided by the gauge, feeding each of said first and second signal to a statistical variance computer to derive therefrom third and fourth signals respectively indicative of the statistical variance of the measurements represented by said first and second signals, and utilizing said third and fourth signals to produce an output signal responsive to the difference between said third and fourth signals and indicative of the value of said profile component of variance.

27. The method of determining the profile component of the variance of a laterally extended, traveling material, which comprises:

traversing a first gauge across the width of said traveling material to produce a first signal responsive to the scanning measurement thereby provided by said gauge, positioning a second gauge at a fixed point along said width to produce a second signal responsive to the dwelling measurement thereby provided by said second gauge, feeding each of said first and second signals to a statistical variance computer to derive therefrom third and fourth signals respectively indicative of the statistical variance of the measurements represented by said first and second signals, and utilizing said third and fourth signals to produce an output signal responsive to the difference between said third and fourth signals and indicative of the value of said profile component of variance.

References Cited

UNITED STATES PATENTS

| | | | |
|---|---|---|---|
| 2,965,300 | 12/1960 | Radley et al. | 235—193 |
| 3,006,225 | 10/1961 | Mamas | 80—56 |
| 3,007,052 | 10/1961 | Hickman et al. | 250—83.3 |
| 3,147,370 | 9/1964 | Lowman | 235—151 |
| 3,179,800 | 4/1965 | McNamara | 250—52 |

EUGENE G. BOTZ, Primary Examiner

U.S. Cl. X.R.

235—151.3

UNITED STATES PATENT OFFICE
CERTIFICATE OF CORRECTION

Patent No. __3,471,685__    Dated __October 7, 1969__

Inventor(s) __Albert B. Bishop III__

It is certified that error appears in the above-identified patent and that said Letters Patent are hereby corrected as shown below:

Column 3, line 39, "recorded" should read -- recorder --; line 42, "transduced" should read -- transducer --.

Column 4, line 4, "seletcor" should read -- selector --.

Column 5, line 42, "the" should read -- time --; line 50, "thre" should read -- three --; line 54, after "mode" insert a period.

Column 8, line 8, "single" should read -- signal --; line 16, "phoportional" should read -- proportional --.

Claim 4, Column 10, line 32, "$\sigma_m^2 = 1/2\sigma_\epsilon^2 - {}_D{}^2$", should read -- $\sigma_m^2 = 1/2\sigma_\epsilon^2 - \sigma_D^2$ --

Claim 11, Column 12, line 8, "$\sigma_r^2 2\sigma_D^2 - 1/2\sigma_\epsilon^2$" should read -- $\sigma_r^2 = 2\sigma_D^2 - 1/2\sigma_\epsilon^2$ --

Claim 21, Column 14, line 46, "result" should read --resultant--.

Signed and sealed this 22nd day of February 1972.

(SEAL)
Attest:

EDWARD M. FLETCHER, JR.
Attesting Officer

ROBERT GOTTSCHALK
Commissioner of Patents